United States Patent [19]

Sevilleja et al.

[11] Patent Number: 5,052,652
[45] Date of Patent: Oct. 1, 1991

[54] ADJUSTABLE MACHINE ISOLATION

[75] Inventors: Jose Sevilleja, Madrid; Jose M. Sandoval, Leganes, both of Spain

[73] Assignee: Otis Elevator Company, Farmington, Conn.

[21] Appl. No.: 582,072

[22] Filed: Sep. 13, 1990

[30] Foreign Application Priority Data

Sep. 19, 1989 [ES] Spain .................................. 8903174

[51] Int. Cl.⁵ ............................................ F16M 13/00
[52] U.S. Cl. ................................... 248/634; 267/153; 267/292; 267/141
[58] Field of Search .............. 248/634, 637, 638, 605, 248/615, 566, 575; 267/153, 292, 141; 52/98, 100

[56] References Cited

U.S. PATENT DOCUMENTS

| | | | |
|---|---|---|---|
| 789,732 | 5/1905 | Hinton | 52/98 |
| 2,699,934 | 1/1955 | Boschi | 248/615 X |
| 2,702,703 | 2/1955 | Franceschetti | 248/634 X |
| 2,982,536 | 5/1961 | Kordes | 267/153 |
| 3,134,585 | 5/1964 | Trask | 267/153 |
| 3,409,284 | 11/1968 | Rix | 267/153 |
| 3,473,766 | 10/1969 | Poole | 267/141 |
| 3,677,535 | 7/1972 | Beck | 267/153 |
| 3,924,907 | 12/1975 | Czernik | 267/141 X |
| 4,198,037 | 4/1980 | Anderson | 267/153 |
| 4,348,015 | 9/1982 | Domer | 267/153 X |
| 4,830,347 | 5/1989 | Longshaw | 52/98 X |
| 4,925,163 | 5/1990 | Wolf et al. | 267/153 |
| 4,962,916 | 10/1990 | Palinkas | 267/153 |

Primary Examiner—David L. Talbott
Assistant Examiner—Korie H. Chan
Attorney, Agent, or Firm—William W. Jones

[57] ABSTRACT

An adjustable device for vibration damping and leveling of machines consisting of an elastic element with a constant thickness, with notches which facilitate its separation in order to obtain the correct support surface and so that the deformation in all the supports is constant, maintaining the horizontal leveling of the machine and good absorption of vibrations. The elastic elements include cavities distributed along the length thereof, in which elastic inserts adjusted to the geometry thereof can be housed in order to appropriately increase the total contact surface and resistance to deformation of the device.

4 Claims, 1 Drawing Sheet

ADJUSTABLE MACHINE ISOLATION

DESCRIPTION

1. Technical Field

As is expressed in the title of this specification, the present invention refers to an adjustable device for vibration damping of machines.

An object of the invention is the obtainment of elastic vibration damping support elements on the resting points of a frame or bed of machines subjected to vibrations. The support can be adjusted to the respective loads of the support points of the machine in such a way that the elastic element of each one of the supports has the same deformation so that the operation of the machine is kept level and it is optimized, especially with regard to vibrations.

The invention is applicable to elevator installations, specifically to the supports of the sheave and motor machine located in the machine room. The elevator sheave and motor does not have a uniform distribution of loads corresponding to each one of the supports since there are weight differences of use with regard to counterweights, loads on the sheave, limitations of space, etc., which in practice produce differences of load between each one of the load bearing points between the machine and the concrete or metal sheet base on which the machine rests, and whereat vibration absorbing elements are placed.

2. Background Art

The present vibration absorption system used at the contact points between the elevator machine and the floor or plate where it rests creates problems regarding achievement of a uniform distribution of the loads on the rubber pad support components of the system, since the loads on each one of the contact points are different whereby each one of the rubber pads experiences different deformations which results in an undesirable performance of the support structure, as well as undesirable vibrations at some of the support pads.

Presently rubber pads of a common dimension are used, therefore when the distribution of loads is unequal, which is most frequently the case, different deformations are produced on the pads. The machine then will not operate in a level position and its functioning is unsatisfactory, especially with respect to vibrations.

The use of these rubber pads of a single size does not allow corrections to be made at the jobsite, or at least in the desired amount, since all these pads have the same hardness and dimensions. Although in some cases two or more pads can be coupled, accurate leveling and vibration control is practically non-existent.

DISCLOSURE OF THE INVENTION

In accordance with the invention an elastic element with a constant thickness with notches or transverse cuts which facilitate the division thereof into components of different lengths is provided. With this arrangement it is possible to ensure that the pressure on the supports is constant by varying the surface area of the elastic element whereby equal deformation and equal vibration absorption are realized.

These elastic elements can be made with different hardnesses in order to be able to attain more accurately the desired result. The elastic elements may also have a repeated series of cavities with a constant transverse section, in which other elastic pads of the same or different material, and shaped, in conformity with the geometric dimensions of the cavity, can be introduced in one or more of the cavities.

With this arrangement and depending on the load to which a certain support point is subjected, the support surface area, and/or the elasticity of the material can be controlled so that deformation is identical on all of the supports.

The most preferred shape for the elastic element is rectangular with a series of equidistant openings in a longitudinal direction and with identical distribution on both sides of the longitudinal axis of symmetry. Prismatic insert elements of an identical height can be placed in these openings.

In order to facilitate the correct positioning of these inserts in the elastic element, at least two opposite flanks of each opening may have recesses which compliment projections provided on the inserts which make it possible to adjust both elements by means of a dovetail, or in other words T-shaped.

In order to facilitate the understanding of the features of the invention and forming an integral part of this specification, a sheet of drawings is enclosed in whose figures with an illustrative and non-restrictive nature the following has been represented.

BEST MODE FOR CARRYING OUT THE INVENTION

Figure 1:
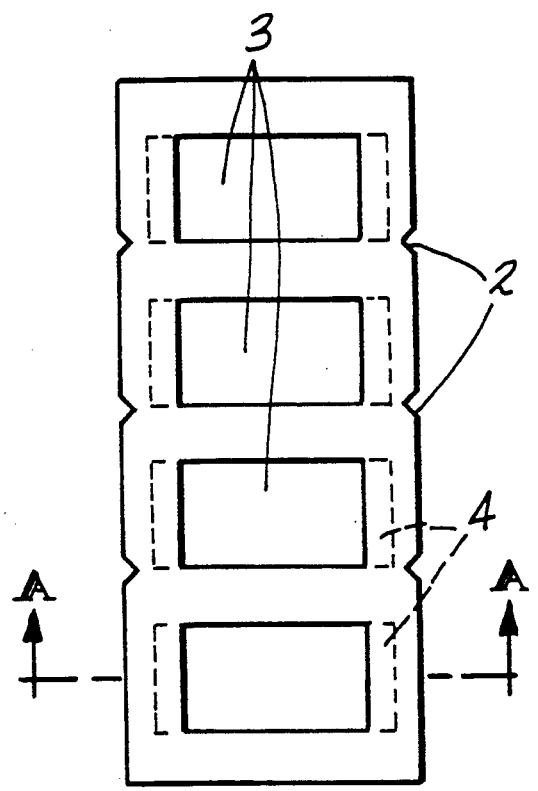
FIG. 1 is a plan view of an elastic element which forms part of the adjustable support device for the vibration damping of machines formed in accordance with this invention.
Figure 2:
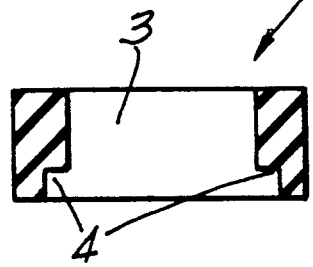
FIG. 2 is a section along the cut line A—A of FIG. 1.
Figure 3:
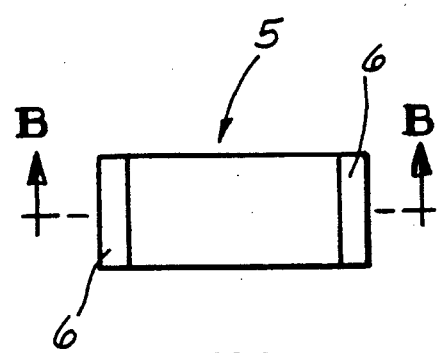
FIG. 3 is a plan view of one of the elastic inserts which is capable of being placed in the elastic element of FIG. 1 in order to increase the deformation resistance of the support.

Referring to the numbering that is indicated in the above cited figures, the adjustable device for the vibration damping of machines, which the invention sets forth, includes an elastic element generally referred to by the numeral 1 having a rectangular prismatic shape and whose larger side surfaces have a series of transversal cuts 2 equally spaced from each other, whereby the length thereof can be easily shortened to the suitable measurement.

The elastic element 1 also includes a series of transverse openings 3 therein. The openings 3 include laterally extending shoulders 4 which open into one of the surfaces of the element 1.

Figure 4:
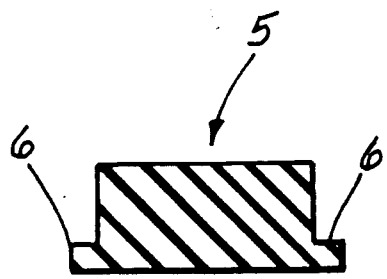
FIG. 4 is a section along the cut line B—B of FIG. 3.

For the purpose of increasing the support surface without having to increase the length of the elastic element 1 whether a fraction of the same is used or not, the support device also includes elastic inserts 5 whose geometry conforms to that of the openings 3 and associated shoulders 4, thus adopting a "T" section as shown in FIG. 4.

The inserts 5 can thus be used to close the openings 3 as desired to obtain the previously calculated vibration damping and leveling requirements. Therefore, the elastic element 1 or main body of the adjustable device can be used alone or in combination with as many elastic inserts 5 as are needed. Similarly, the elastic element 1 can be used whole or can be cut at any of the indicated marks 2.

The arms 6 of the "T" section of the elastic inserts 5 are positioned on the shoulders 4 of the openings 3 of the element 1, thereby leveling the major surfaces of both the element 1 and the inserts 5.

We claim:

1. An adjustable support device for vibration damping of machines which allows establishment of varying compressibility of points of contact between different parts of the machine and the floor, said device including an elastic element with a constant thickness, and having transverse cuts to facilitate shortening of the support surface of the device into different length supports having different compressibilities, which said supports may be appropriately disposed under the machine so that heavier and lighter portions of the machine will be evenly supported whereby compression and deformation of the supports are kept constant in order to evenly absorb vibrations and maintain the machine level, and in addition, said elastic element includes uniformly distributed cavities in which respective elastic inserts of the same or a different hardness material can be removably positioned, for the purpose of modifying the elastic deformation of the support device.

2. The adjustable support device of claim 1 wherein the elastic element is rectangular and prismatic and the cavities are equidistant in the central longitudinal direction.

3. The adjustable support device of claim 2, in which at least two opposite sides of each cavity have shoulders which cooperate with projections on the elastic inserts to form means for the correct stable positioning of the inserts in the elastic element.

4. The adjustable support device of claim 3, wherein said insert projections and the cavity shoulders both define opposite rectangular section arms, which make the cross section of the insert and of the cavity have a "T" shape.

* * * * *